(12) United States Patent
Kim

(10) Patent No.: US 7,890,151 B2
(45) Date of Patent: Feb. 15, 2011

(54) OPENING AND CLOSING DEVICE FOR CELLULAR PHONE

(75) Inventor: Si-Wan Kim, Bucheon-si (KR)

(73) Assignee: Laird Technologies Korea YH, Bucheon-si, Gyeonggi-do (KR)

(*) Notice: Subject to any disclaimer, the term of this patent is extended or adjusted under 35 U.S.C. 154(b) by 561 days.

(21) Appl. No.: 12/065,568

(22) PCT Filed: Jun. 15, 2007

(86) PCT No.: PCT/KR2007/002917

§ 371 (c)(1),
(2), (4) Date: Mar. 3, 2008

(87) PCT Pub. No.: WO2007/145485

PCT Pub. Date: Dec. 21, 2007

(65) Prior Publication Data

US 2008/0207280 A1    Aug. 28, 2008

(30) Foreign Application Priority Data

Jun. 16, 2006    (KR) .................... 10-2006-0054333

(51) Int. Cl.
*H04M 1/03*    (2006.01)
*E05D 7/00*    (2006.01)
(52) U.S. Cl. ..................... 455/575.3; 16/221
(58) Field of Classification Search .............. None
See application file for complete search history.

(56) References Cited

U.S. PATENT DOCUMENTS

| 5,697,124 | A  | * | 12/1997 | Jung ............................. 16/341 |
| 6,292,980 | B1 | * | 9/2001 | Yi et al. ......................... 16/303 |
| 7,117,562 | B2 | * | 10/2006 | Zuo et al. ....................... 16/303 |
| 7,140,073 | B2 | * | 11/2006 | Park et al. ....................... 16/348 |
| 7,150,072 | B2 | * | 12/2006 | Huang et al. .................... 16/312 |
| 7,168,135 | B2 | * | 1/2007 | Jung et al. ...................... 16/367 |
| 7,213,301 | B2 | * | 5/2007 | Sakai et al. .................... 16/303 |
| 7,433,467 | B2 | * | 10/2008 | Yi ........................... 379/433.13 |
| 7,434,296 | B2 | * | 10/2008 | Kubota ......................... 16/330 |
| 2001/0053674 | A1 |  | 12/2001 | Katoh |
| 2003/0162509 | A1 | * | 8/2003 | Bae et al. ....................... 455/90 |

FOREIGN PATENT DOCUMENTS

| JP | 2004-044743 A | 2/2004 |
| KR | 10-2001-0026426 A | 4/2001 |
| KR | 10-2004-0107609 A | 12/2004 |
| KR | 10-2005-0011856 A | 1/2005 |

* cited by examiner

*Primary Examiner*—Matthew D Anderson
*Assistant Examiner*—Gennadiy Tsvey
(74) *Attorney, Agent, or Firm*—Harness, Dickey & Pierce, P.L.C.

(57) ABSTRACT

Disclosed herein is an apparatus for opening and closing a portable terminal. The apparatus includes a second cam, which has an upper rib to be latched with the upper portion of the housing and a lower rib to be latched with the bottom of the housing, thereby providing structural stability. In addition, frictional wear and noise can be suppressed while the second cam moves, thereby improving the service life and reliability of the device.

3 Claims, 5 Drawing Sheets

[FIG. 1]
PRIOR ART
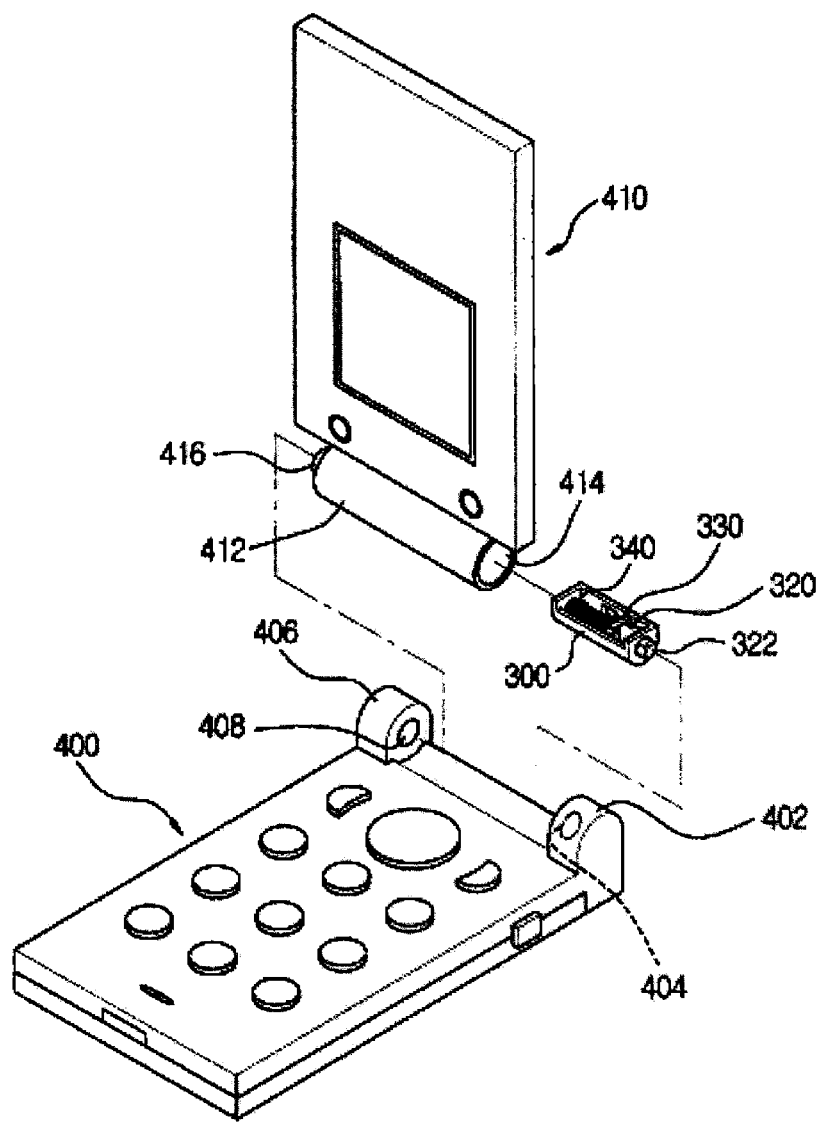

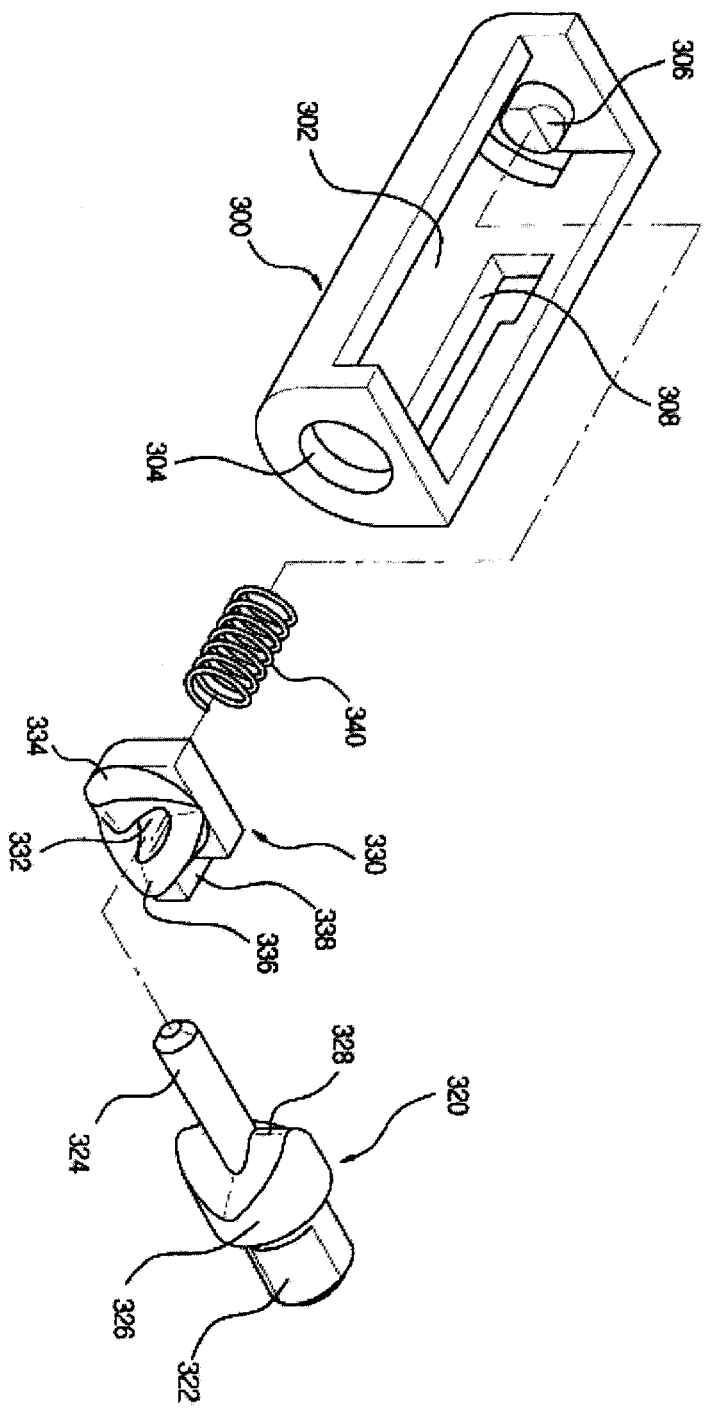
[FIG. 2]
PRIOR ART

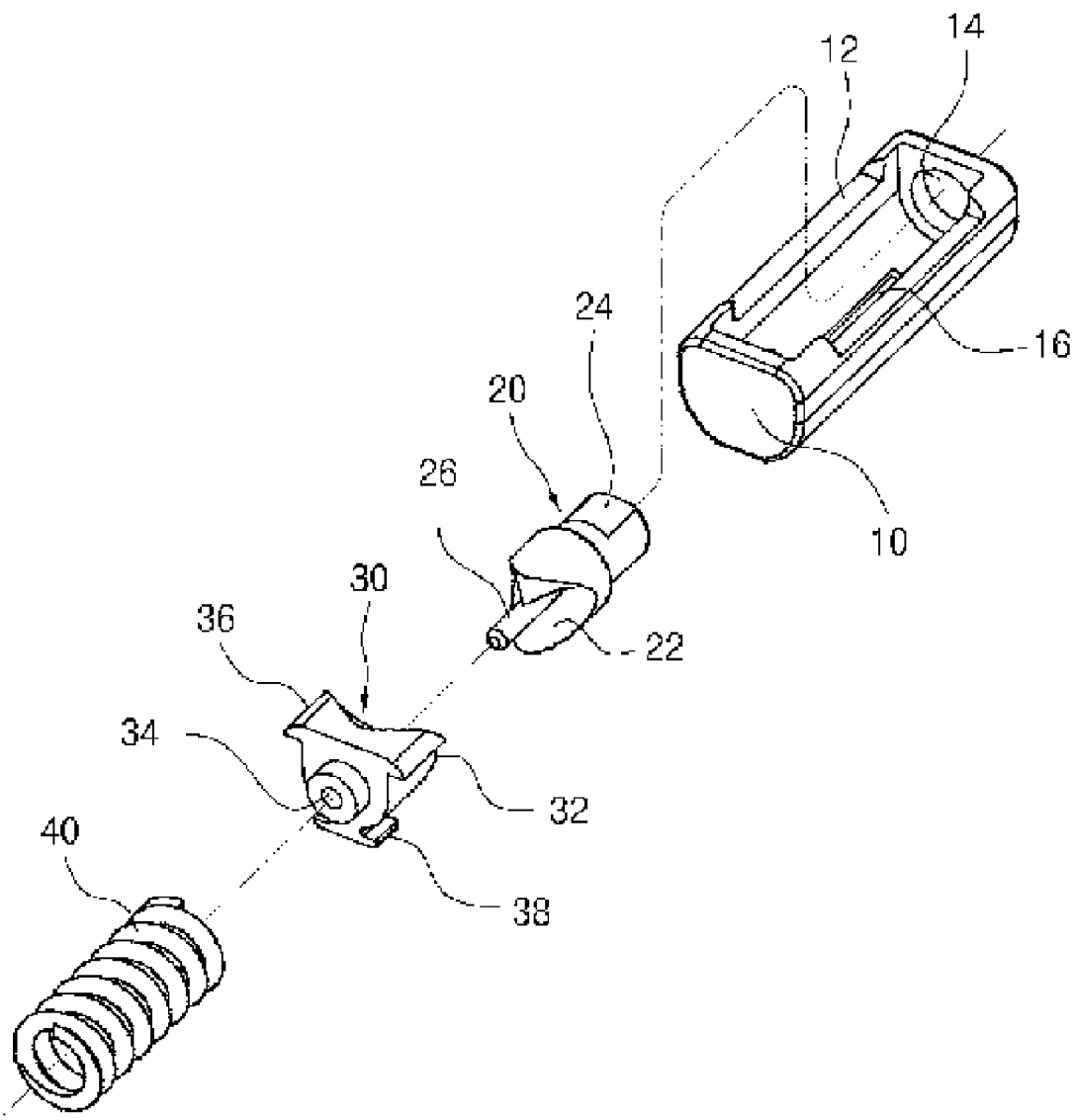
[Fig. 3]

[Fig. 4]
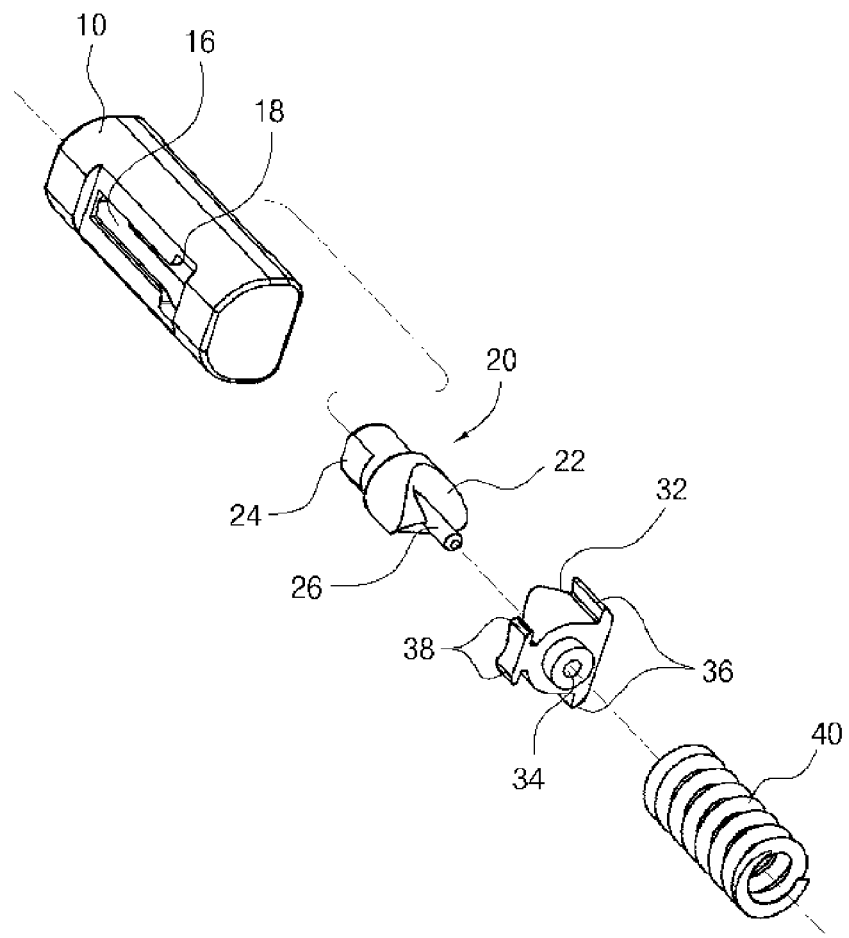
[Fig. 5]
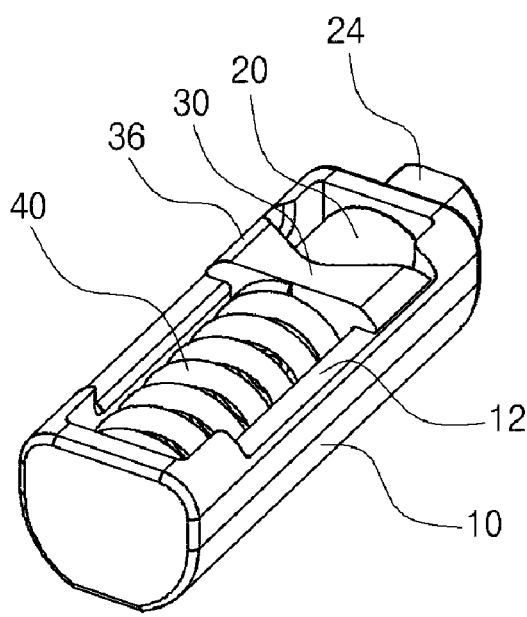

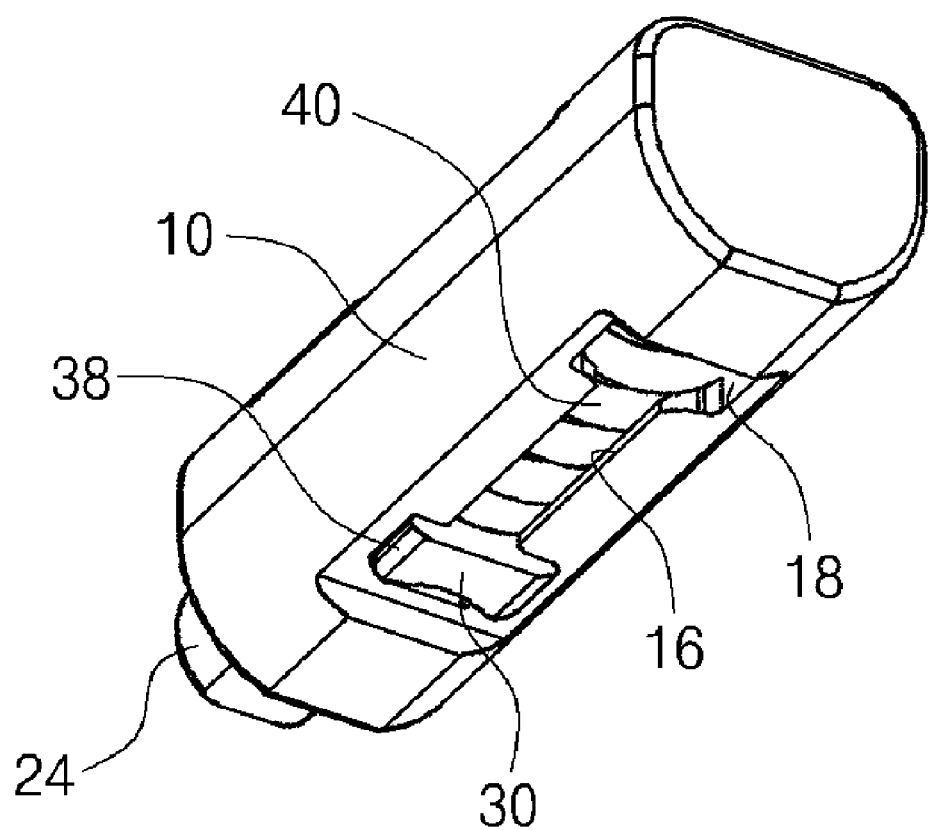
[Fig. 6]

OPENING AND CLOSING DEVICE FOR CELLULAR PHONE

CROSS-REFERENCE TO RELATED APPLICATIONS

This application is a 371 of PCT International Application No. PCT/KR2007/002917 filed Jun. 15, 2007 (Publication No. WO2007/145485), which claims priority to Korean Application No. 10-2006-0054333 filed Jun. 16, 2006 (now Korean Patent No. KR10-0701500 issued Mar. 23, 2007). The disclosures of the above applications are incorporated herein by reference.

TECHNICAL FIELD

The present invention relates to an apparatus for opening and closing portable terminals. More specifically, the invention relates to a mechanism for opening and closing the cover of a portable terminal in a foldable and semi-automatic mode.

BACKGROUND ART

In recent years, portable terminals having a foldable cover have become popular.

FIG. 1 is a perspective view showing a conventional foldable mechanism for opening and closing a portable terminal 400. FIG. 2 is an exploded perspective view a portion of the folding mechanism shown in FIG. 1.

This folding mechanism for a portable terminal includes a holder portion 412 fixed to a cover 410, a housing 300 inserted into and fixed to the holder portion 412, a first slip portion 320 rotatably housed inside of the housing 300, a second slip portion 330 fixedly housed inside of the housing and contacting the first slip portion 320, a spring 340 urging the second slip portion 330 towards the first slip portion 320, a first support portion 402 formed in a main body so as to engage the first slip portion 320, and a second support portion 406 formed in the main body so as to rotatably support the holder portion 412.

The holder portion 412 is provided at one side thereof with an opening 414 into which the housing 300 is inserted, and at the other side thereof with a rotation shaft 416 protruding so as to be rotatably coupled with the second support portion 406.

In addition, the housing 300 (FIG. 2) has an internal space 302 opened such that the first slip portion 320, the second slip portion 330 and the spring 340 are housed inside thereof. Formed in one side of the internal space 302 is a through hole 304 and in the other side of the internal space 302 is a protrusion 306.

The first slip portion 320 has a coupling shaft 322 passing through the through-hole 304, and a connection shaft 324 formed in the opposite side to the coupling shaft 322. Formed around the connection shaft 324 is a first cylinder portion 326, on top of which a first waveform face 328 is formed. The first waveform face 328 has a wave of two periods per rotation around the connection shaft 324.

The second slip portion 330 is provided with a connection hole 332 formed with which the connection shaft 324 is rotatably engaged. A second cylinder portion 334 is formed around the connection hole 332. Formed on top of the second cylinder portion 334 is a second waveform face 336 corresponding to the first waveform face 328.

The connection shaft 324 is inserted into the connection hole 332 so as to prevent the first and second slip portions 320 and 330 from being disengaged from each other, i.e., to allow a linear movement against each other when the first and second waveform faces 328 and 336 contact and rotate.

Further, the second slip portion 330 is formed with a sliding protrusion 338 at the lateral side. In the internal opening 302 of the housing 300, a sliding groove 308 is formed along the moving direction of the second slip portion 330 for the sliding protrusion 338 to be inserted into the sliding groove 308. Thus, the second slip portion 330 is allowed to carry out a linear movement, not a rotational motion.

On the other hand, one end of the spring 340 is coupled with the protrusion 306 and the other end thereof is housed in the internal space 302 so as to urge the second slip portion 330. The connection shaft 324 passes through the connection hole 332 and then is inserted into the spring 340 center to prevent the spring 340 from bending.

The first support portion 402 is formed with a fixing hole 404 to which the connection shaft 322 is fixed. The second support portion 406 is formed with a rotation hole 408 to which the rotation shaft 416 is rotatably coupled.

In the above conventional mechanism, however a single sliding groove 308 is provided in the housing 300 and a single sliding protrusion 338 is provided in the second slip portion 330. Thus, the connection between the housing 300 and the second slip portion 330 is unstable for this conventional foldable mechanism.

The first slip portion 320 is relatively stable since its coupling shaft 322 is coupled to the cover 410 to perform a rotational movement only. However, the second slip portion 330 may cause distortion during its linear movement along the connection shaft 324. Due to this distortion, the second slip portion 330 incurs frictional wear with the housing 300 and produces frictional noises. In addition, this frictional wear leads to shortening of the service life of the second slip portion 330.

DISCLOSURE OF THE INVENTION

Technical Problem

The present invention has been made in order to solve at least part of the problems in the art. It is an object of the invention to (and embodiments disclosed herein may) provide a foldable and semi-automatic mechanism for opening and closing the cover of a portable terminal.

Technical Solution

In order to accomplish the above objects, according to one aspect of the invention, there is provided an apparatus for opening and closing a portable terminal. The apparatus comprises a housing having an internal space, a first cam rotatably installed inside of the housing, a second cam installed inside of the housing so as to contact the first cam and to be linearly movable inside of the housing, and a resilient member for urging the first and second cam towards each other. The housing is provided with an elongated cut-out groove formed at the bottom of the housing along the moving direction of the second cam, and the second cam is provided with a lower rib formed such that the lower rib passes through the cut-out groove from inside of the housing and is slidably latched with the cut-out groove in the outside of the housing.

In an embodiment, the housing is provided with a sliding face formed at the edge of the opening along the moving direction of the second cam, and the second cam is provided with an upper rib formed so as to be slidably latched with the sliding face.

In an embodiment, the cut-out groove is provided with an expanded portion formed to have a wider width so as to pass the lower rib.

Advantageous Effects

In the opening and closing apparatus of the invention embodiments, the second cam has an upper rib to be latched with the upper portion of the housing and a lower rib to be latched with the bottom of the housing, thereby providing for structural stability. In addition, frictional wear and noise can be suppressed while the second cam moves, thereby improving the service life and reliability of the device.

BRIEF DESCRIPTION OF THE DRAWINGS

Further objects and advantages of the invention can be more fully understood from the following detailed description taken in conjunction with the accompanying drawings in which:

FIG. 1 is a perspective view showing a conventional foldable mechanism for opening and closing a portable terminal;

FIG. 2 is an exploded perspective view a portion of the foldable mechanism shown in of FIG. 1;

FIGS. 3 and 4 are exploded perspective views of a folding mechanism of a portable terminal according to an embodiment of the invention; and FIGS. 5 and 6 are perspective views of the folding mechanism of FIGS. 3 and 4.

MODE FOR THE INVENTION

Hereafter, exemplary embodiments of the invention will be explained, with reference to the accompanying drawings.

FIGS. 3 and 4 are exploded perspective views of a folding mechanism of a portable terminal according to an embodiment of the invention. FIGS. 5 and 6 are perspective views of the folding mechanism of FIGS. 3 and 4.

The foldable opening and closing mechanism of a portable terminal includes a housing 10, to one end side of which a through-hole 14 is formed and towards the top of which is opened. A first cam 20 is housed in the housing 10 so as to be movable along the longitudinal direction of the housing 10. An external connection shaft 24 is formed in the one side thereof so as to protrude through the through-hole 14. Formed in the other side of the first cam 20 is a first waveform face 22 having an axis corresponding to its own moving direction. A second cam 30 is housed in the housing 10 so as to be movable inside the housing 10. The second cam 30 has a second waveform face 32 formed correspondingly to the first waveform face 22. The first and second waveform faces 22 and 32 are faced to each other. The first and second cams 20 and 30 are urged towards each other by means of a resilient member.

The housing 10 is provided with two sliding faces 12 formed along both longitudinal edges of the opening of the housing. An elongated cut-out groove 16 is formed in the bottom floor of the housing 10 in the longitudinal direction thereof. Formed in one end of the cut-out groove 16 is an expanded portion 18 (FIG. 5) having a larger width.

The second cam 30 is formed with two upper ribs 36 slidably latched with the respective sliding faces 12 of the housing 10. Further the second cam 30 is formed with two lower ribs 38, which pass through the expanded portion 18 from inside of the housing 10 and are then slidably latched with both edges of the cut-out groove 16 from outside of the housing 10.

The first cam 20 is provided with a guide shaft 26 protruding towards the second cam 30. The second cam 30 is formed with a guide hole 34 to which the guide shaft 26 is rotatably engaged.

The resilient member employs various types of springs generating a pushing force, such as a compression spring, a leaf spring and a dish spring. In this embodiment, a compression spring 40 is used.

When assembling the foldable mechanism having the above structure, first the guide shaft 26 of the first cam 20 is passed through the guide hole 34 of the second cam 30.

Then, the first and second cams 20 and 30 are put into the housing 10 while the lower rib 38 of the second cam 30 passes through the expanded portion 18. If the first and second cams 20 and 30 are moved towards the through-hole 14 of the housing 10, the external shaft 24 of the first cam 20 protrudes externally through the through-hole 14, the upper rib 36 of the second cam 30 is latched with the sliding face 12, and the lower rib 38 thereof is latched with the edges of the cut-out groove 16.

Two upper ribs 36 are latched with the sliding faces 12 of the housing 10 and the lower rib 38 is latched with the cut-out groove 16, thereby providing structural stability. Thus, the second cam 30 can be prevented from being distorted while linearly moving.

Therefore, the second cam 30 can move without producing unacceptable frictional noises and its service life can be extended.

INDUSTRIAL APPLICABILITY

As described above, the present invention provides embodiments of a foldable opening and closing mechanism for portable terminals in a semi-automatic mode. In this mechanism, movement of the cam does not cause frictional wear and noises, thereby extending the service life of the mechanism and improving reliability thereof.

Although the present invention has been described with reference to several exemplary embodiments, the description is illustrative of the invention and is not to be construed as limiting the invention. Various modifications and variations may occur to those skilled in the art, without departing from the spirit and scope of the invention, as defined by the appended claims.

The invention claimed is:

1. An apparatus for opening and closing a portable terminal, the apparatus comprising:
   a housing having an internal space;
   a first cam rotatably installed inside of the housing;
   a second cam installed inside of the housing so as to contact the first cam and to be linearly movable inside of the housing; and
   a resilient member for urging the first and second cam towards each other, wherein the housing includes an elongated cut-out groove at the bottom of the housing along a moving direction of the second cam, and the second cam includes a lower rib that passes through the cut-out groove from inside of the housing and is slidably latched with the cutout groove in the outside of the housing.

2. The apparatus as claimed in claim 1, wherein the housing includes a sliding face at an edge of an opening of the housing along the moving direction of the second cam, and the second cam includes an upper rib slidably latched with the sliding face.

3. The apparatus as claimed in claim 1, wherein the cut-out groove includes an expanded portion having a wider width so as to pass the lower rib.

* * * * *